Aug. 28, 1928.

H. A. HANDS 1,682,223

MEANS RELATING TO THE MANUFACTURE OF RUBBER WATER BOTTLES

Original Filed March 21, 1927

Inventor

HOWARD A. HANDS,

By Spear, Middleton, Donaldson & Hall

Attorneys

Patented Aug. 28, 1928.

1,682,223

UNITED STATES PATENT OFFICE.

HOWARD A. HANDS, OF WATERTOWN, MASSACHUSETTS, ASSIGNOR TO HOOD RUBBER COMPANY, OF WATERTOWN, MASSACHUSETTS, A CORPORATION OF MASSACHUSETTS.

MEANS RELATING TO THE MANUFACTURE OF RUBBER WATER BOTTLES.

Original application filed March 21, 1927, Serial No. 177,010. Divided and this application filed August 22, 1927. Serial No. 214,676.

My present invention relates to an apparatus for securing hard rubber ferrules in the necks of water bottles, made of soft or flexible rubber, the ferrules being adapted to receive the screw closure plugs.

The invention aims to provide an improved means by which such bags may have the ferrules expeditiously and firmly secured therein without damage to the neck of the bag through application of too much heat thereto, and the invention comprises the novel means hereinafter described and defined by the appended claim.

In order that the invention may be better understood reference is made to the accompanying drawing in which:—

Figure 1:
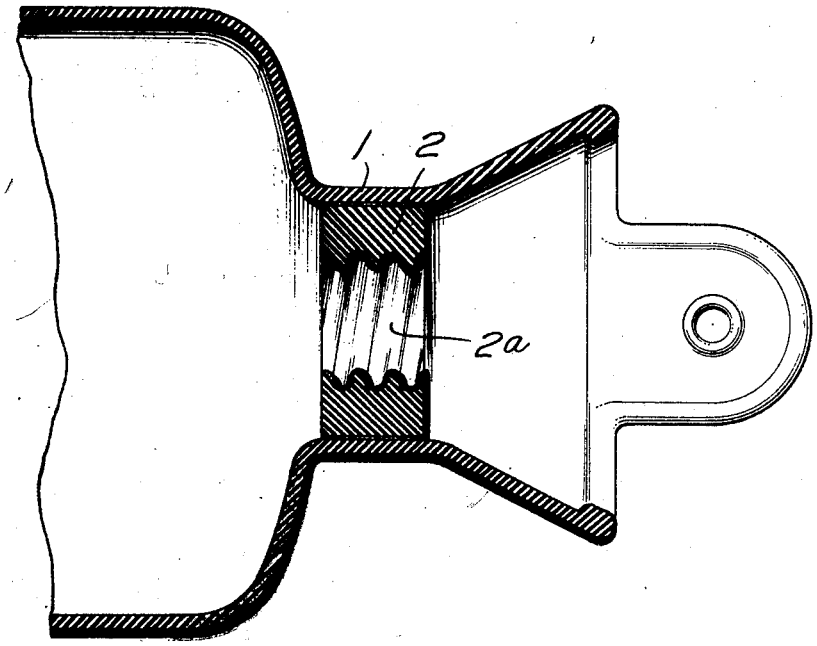
Fig. 1 is a sectional view through the neck of a bottle with the ferrule in place therein.

Referring by reference characters to this drawing, the numeral 1 designates the neck of a water bottle of the usual type and 2 the hard rubber ferrule adapted to fit within the neck and having a threaded bore 2ª to receive the usual closure plug or stopper (not shown). Before the ferrule is inserted in the neck, either the internal surface of the neck or the corresponding exterior surface of the ferrule, is provided with a coating of vulcanizable rubber cement of known character, whereafter the ferrule is inserted in the neck into the position shown in Fig. 1.

To effect the vulcanization of the cement, I provide an element 3 having a reduced portion provided with schew threads 3ª adapted to screw into the threaded bore of the hard rubber ferrule and having in its larger end an internally screw threaded axial recess. The electric soldering irons in common use are provided with threaded ends upon which are screwed removable soldering tips as is well known.

Figure 2:
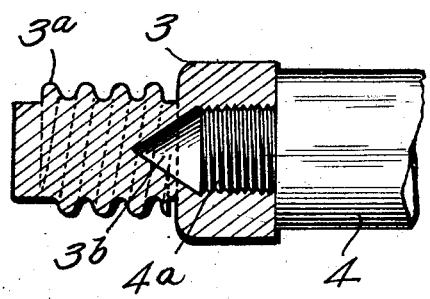
Fig. 2 is a sectional view of the heat transmitting element and a portion of a soldering iron engaged therewith.

The forward end of such soldering iron is shown conventionally at 4 in Fig. 2. To enable such a soldering iron to be used to carry out my process the element 3 is adapted to replace the usual soldering tip, its bore 3ᵇ being adapted to screw onto the threaded end 4ª of the iron 4 after the tip has been removed.

The element 3 is made of good heat conducting material such as brass or bronze for example and, having been applied to the soldering iron and screwed into the hard rubber ferrule with the latter in place in the bottle neck, the electric current is turned on (regulated to produce the proper degree of heat), which heat is transmitted to and through the hard rubber ferrule until the cement is completely cured. While this is taking place the neck of the bottle has its exterior exposed to the air which constitutes a cooling fluid.

I have found that by this method and means the necessary heat may be applied without detrimentally affecting the hard rubber ferrule and without danger of damaging the soft rubber neck, towards which the air exposure contributes.

Obviously the ferrule may be applied to the element 3 while the latter is in place on the soldering iron tip (before the heating current is turned on) and the soldering iron used as a convenient handle for inserting the ferrule in the neck.

This application is a division of my co-pending application #177,010 Mar. 21, 1927; now Patent 1,644,829 Oct. 11, 1927.

What I claim is:

Means for effecting the vulcanization of the cement between the necks of water bottles and the hard rubber ferrules therein, having threaded bores, comprising a tip member of heat conducting material having an exteriorly threaded portion adapted to screw into the ferrule and having an interiorly threaded portion adapted to screw onto the end of the ordinary electric soldering iron.

In testimony whereof, I affix my signature.

HOWARD A. HANDS.